United States Patent [19]
Ryon

[11] Patent Number: 5,130,525
[45] Date of Patent: Jul. 14, 1992

[54] METHOD AND APPARATUS FOR REAL TIME MOTION AND IMAGE ANALYSIS

[75] Inventor: Randall C. Ryon, Fairport, N.Y.

[73] Assignee: Xerox Corporation, Stamford, Conn.

[21] Appl. No.: 589,697

[22] Filed: Sep. 28, 1990

[51] Int. Cl.[5] .......................... H01J 40/14; G06K 9/18
[52] U.S. Cl. .............................. 250/208.1; 250/237 G; 358/406
[58] Field of Search ............. 250/208.1, 237 G; 358/405, 481, 482, 483, 488, 494

[56] References Cited

U.S. PATENT DOCUMENTS

| | | | |
|---|---|---|---|
| 4,449,046 | 5/1984 | Zuckerman et al. | 358/494 |
| 4,464,681 | 8/1984 | Jacobs et al. | 358/406 |
| 4,605,970 | 8/1986 | Hawkins et al. | 358/406 |
| 4,641,357 | 2/1987 | Satoh | 358/497 |
| 4,695,722 | 9/1987 | Motooka | 358/494 |
| 4,749,872 | 6/1988 | Asada et al. | 358/483 |
| 4,761,660 | 8/1988 | Lee | 250/237 G |
| 4,853,535 | 8/1989 | Suganuma | 358/494 |
| 5,015,846 | 5/1991 | Okuyama et al. | 358/494 |

OTHER PUBLICATIONS

"Fundamentals of Digital Copiers"—Canon, Oct. 1984.

*Primary Examiner*—David C. Nelms
*Assistant Examiner*—John R. Lee
*Attorney, Agent, or Firm*—Oliff & Berridge

[57] ABSTRACT

A document image scanner is provided in which a platen is provided with an optical target in the form of a succession of ruling lines provided at one edge thereof. The ruling lines are inclined at an angle relative to a direction of scan of an optical sensor array such that 5% or less coverage change is provided over each pixel on a scanning line of the array. An output signal from scanning each line can be produced as a square wave signal. From the generated signal, the scanning motion may be corrected. A diagnostic tool is also provided for diagnosing scanning motion using at least two of the optical targets.

34 Claims, 13 Drawing Sheets

FIG. 7

METHOD AND APPARATUS FOR REAL TIME MOTION AND IMAGE ANALYSIS

BACKGROUND OF THE INVENTION

1. Field of the Invention

The present invention relates to a system of electronic reprographics and, more particularly, to a system of electronic reprographics in which scanning motion and image quality are analyzed and corrected as necessary.

2. Description of the Related Art

In light lens printing systems, a lamp or flashing unit flashes light on a document and has an image created synchronously on a photoreceptor belt. The photoreceptor belt picks up toner from which a copy is made.

In electronic reprographic printing systems, a document or series of documents comprising at least one print job are successively scanned. Upon scanning of the documents, image signals are obtained and electronically stored. The signals are then read out successively and transferred to a printer for formation of the images on paper. Once a document is scanned, it can be printed any number of times or processed in any number of ways (e.g., words deleted or added, image magnified or reduced, etc.). If a plurality of documents comprises a job which is scanned, the processing or manipulation of the scanned documents can include deletion of one or more documents, reordering of the documents into a desired order, or addition of a previously or subsequently scanned document or documents. The printing or processing can be relatively synchronous with scanning, or asynchronous after scanning. If asynchronous, a time interval exists between scanning and printing or processing. The system can then accumulate a number of scanned jobs in the system memory for subsequent processing or printing. The order of the jobs to be printed may be different from the order of jobs as scanned depending on the priority of the jobs and the desires of the operator for increasing productivity or through-put and decreasing printer or scanner downtime.

Scanning of documents can be accomplished by providing a scanning mechanism for focusing selected portions of the document upon photosensitive cells which generate electrical signals related to the light level falling upon the cells. One problem with document scanners is the difficulty of adjusting the position of the photosensitive cells to obtain the desired location of the image upon the photosensitive cells. This problem is particularly prevalent in electronic reprographic printing systems which require a high degree of accuracy of the position on each scanning line.

A number of methods and apparatus are known for scanning documents. For example, U.S. Pat. No. 4,464,681 to Jacobs et al discloses a method and apparatus for adjusting a facsimile document scanner in which a test pattern is used to adjust the facsimile. In particular, a test pattern is printed on a piece of paper which is adhered to the inside of the facsimile for calibrating the facsimile. When the image of the test pattern is the same size as the photodiode array and when the image is precisely focused upon the photodiode array, the dark and light image stripes of the pattern fall exactly upon alternate photocells of the photodiode array.

U.S. Pat. No. 4,605,970 to Hawkins discloses a diagnostic tool for calibrating an optical document digitizer, comprising a strip composed of an optical pattern of contrasting light and dark areas on one surface thereof. Such strips or ladder charts provide a crude method of determining the position of the document being scanned. A number of scanning lines must be read in order to determine location.

U.S. Pat. No. 4,749,872 to Asada et al provides a target for reference of home positions in a document scan apparatus. A reference position marker is mounted on the document support table which directly reflects light from a document illumination light source into an optical sensor array through a mirror and a lens which causes the array to operate in a saturated range to generate a higher output signal level than an expected highest signal level of the sensor array.

U.S. Pat. No. 4,641,357 to Satoh discloses an apparatus for scanning a document image wherein a single reference strip is provided along the side of a moving platen. The reference strip comprises a pattern of optically scannable reference lines inclined at a 45° angle with respect to the CCD and the platen. An analyze circuit is provided for determining whether a right edge of a black stripe of the lines is at a detect position in which case image data of the respective line is gated to a buffer memory of an image process circuit and the detect position is shifted to the next picture element position. If the condition is not satisfied, the image data is discarded (not supplied to the buffer memory) and the detect position is unchanged. Using the stripe pattern of lines, the system is effectively rendered insensitive to interruptions of document motion and/or variations in document motion speed.

With electronic reprographic printing systems, the position of the document must be precisely controlled. Methods and apparatus are therefore required which can determine any displacements in a scan line position and to correct these displacements. It is further desirable to diagnose and correct motion and vibratory problems within such a system.

OBJECTS AND SUMMARY OF THE INVENTION

Accordingly, one object of the present invention is to provide an electronic reprographic system which monitors and corrects scanning accuracy.

Another object of the invention is to provide a scanning accuracy control system for real time motion and image quality correction of a scanner.

A further object of the invention is to provide a diagnostic system for a scanner and an electronic reprographic system.

To achieve the foregoing and other objects, and to overcome the shortcomings discussed above, a document image scanner is provided which detects the motion of a scanner and corrects the scanning motion if necessary. In particular, a platen may be provided with a pattern of optically scannable lines (Ronchi or ruling lines) on one edge thereof, and a CCD (charge coupled device) for optically scanning the ruling lines. The signals produced from the scanning operation may be processed and analyzed. Depending on the acquired data, correction of the scanning may be performed. The Ronchi lines are provided with a slight skew which permits a highly precise detection and control of the scanning operations.

The present invention also provides a diagnostic tool wherein two or more sets of ruling lines may be provided on the scanning platen for analyzing the scanning motion for problems such as vibrations within the optics and optics drives.

BRIEF DESCRIPTION OF THE DRAWINGS

The invention will be described in detail with reference to the following drawings in which like reference numerals refer to like elements and wherein:

FIG. 7 is a view depicting an exemplary job programming ticket and job scorecard displayed on the User Interface (UI) touchscreen of the printing system shown in FIG. 1;

DETAILED DESCRIPTION OF THE PREFERRED EMBODIMENTS

The System

Figure 1:
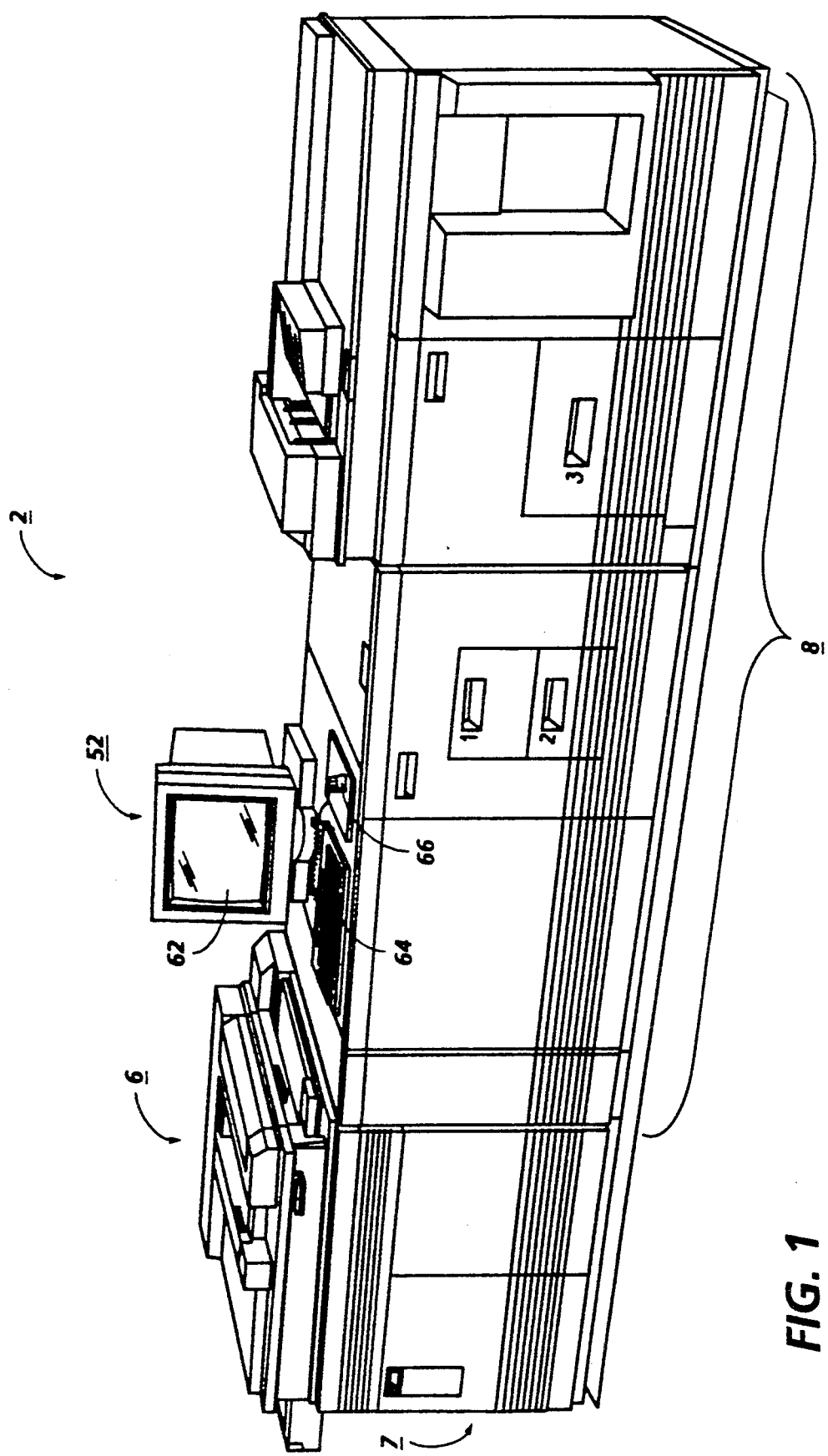
FIG. 1 is a view depicting an electronic printing system incorporating the print media identification system of the present invention.
Figure 2:
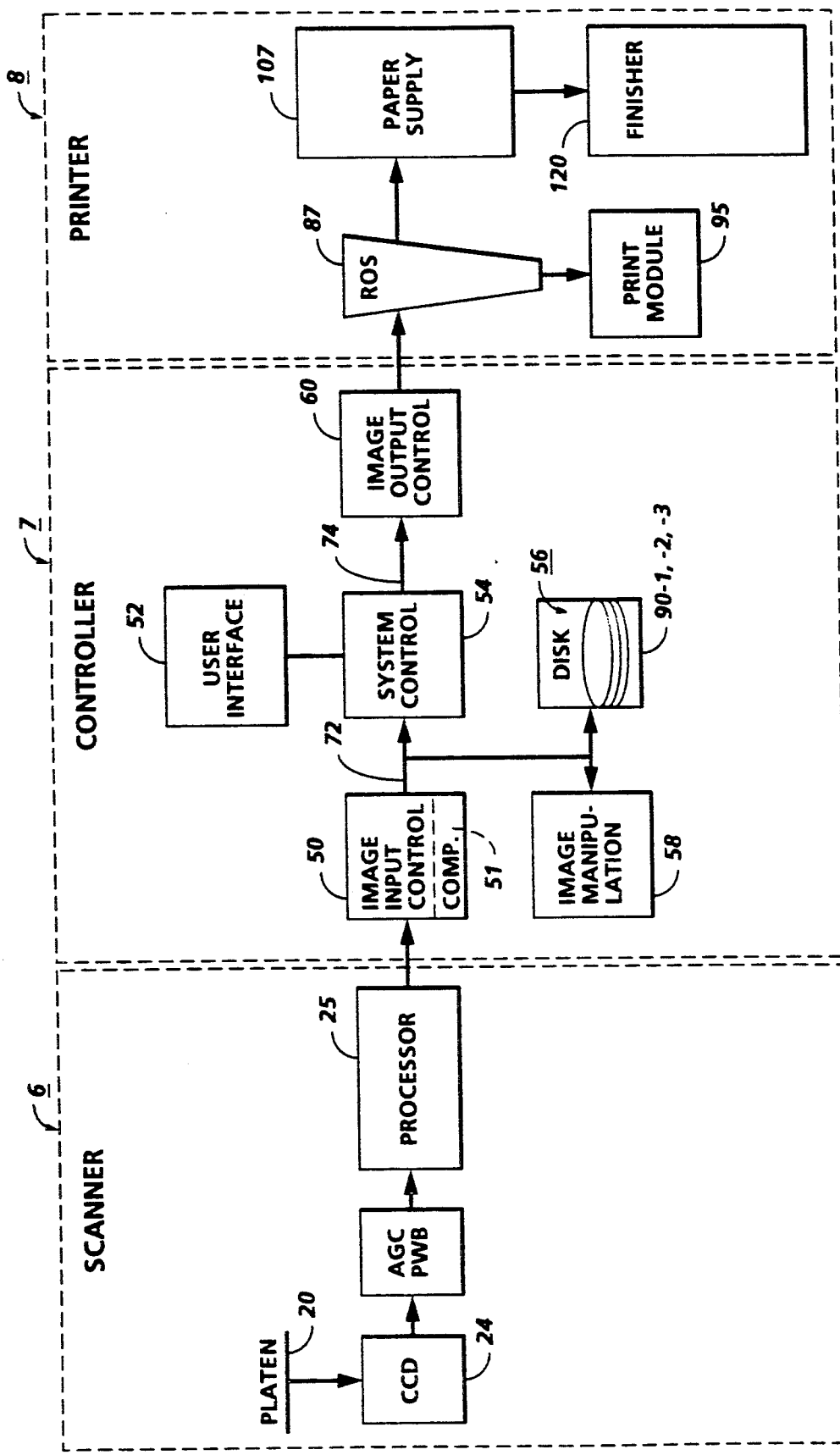
FIG. 2 is a block diagram depicting the major elements of the printing system shown in FIG. 1.

Referring now to the drawings, and particularly to FIGS. 1 and 2 thereof, there is shown an exemplary laser based printing system 2 for processing print jobs in accordance with the teachings of the present invention. Printing system 2, for purposes of explanation, is divided into a scanner section 6, controller section 7, and printer section 8. While a specific printing system is shown and described, the present invention may be used with other types of printing systems such as ink jet, ionographic, etc.

Figure 3:
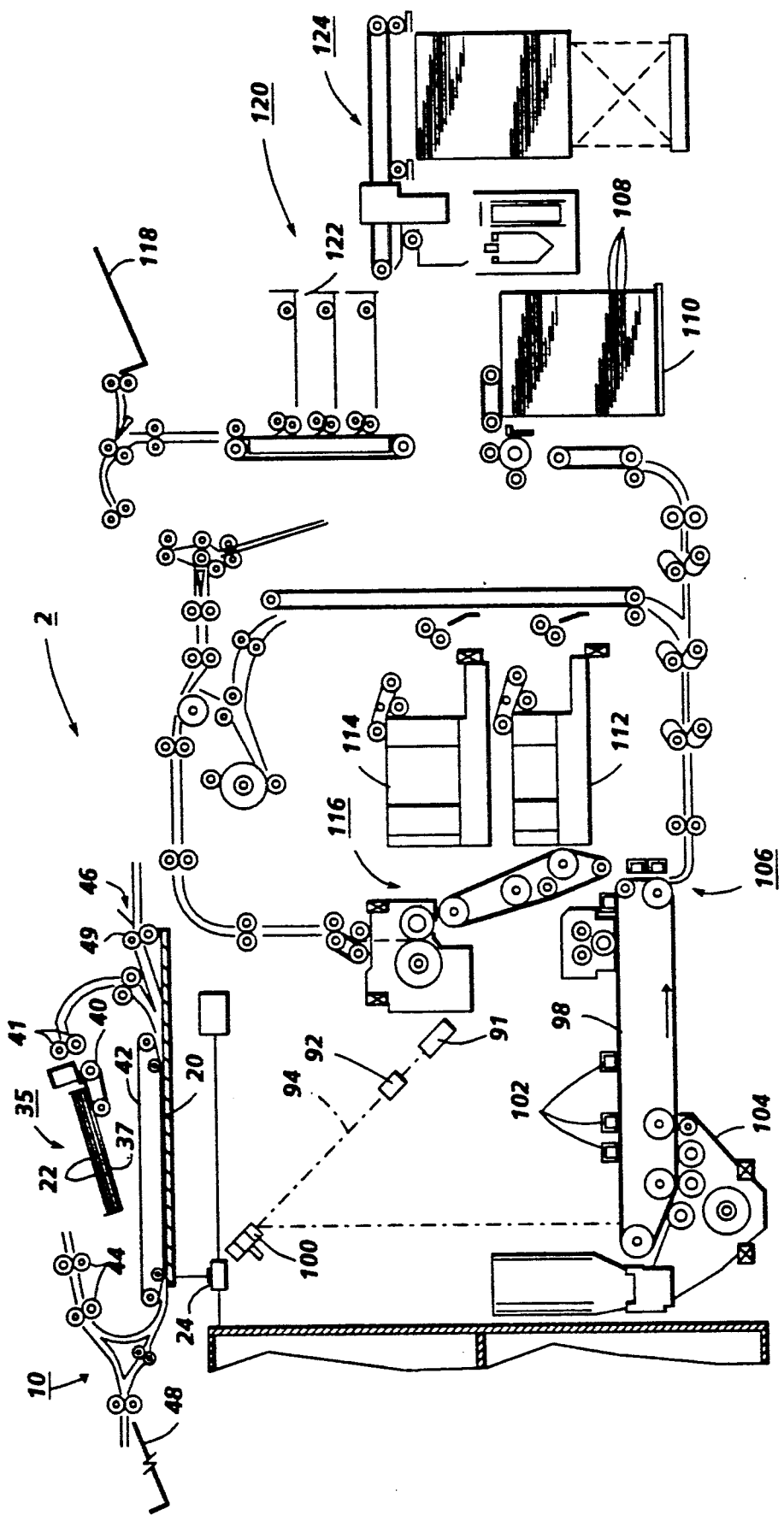
FIG. 3 is a plan view illustrating the principal mechanical components of the printing system shown in FIG. 1.
Figure 4:
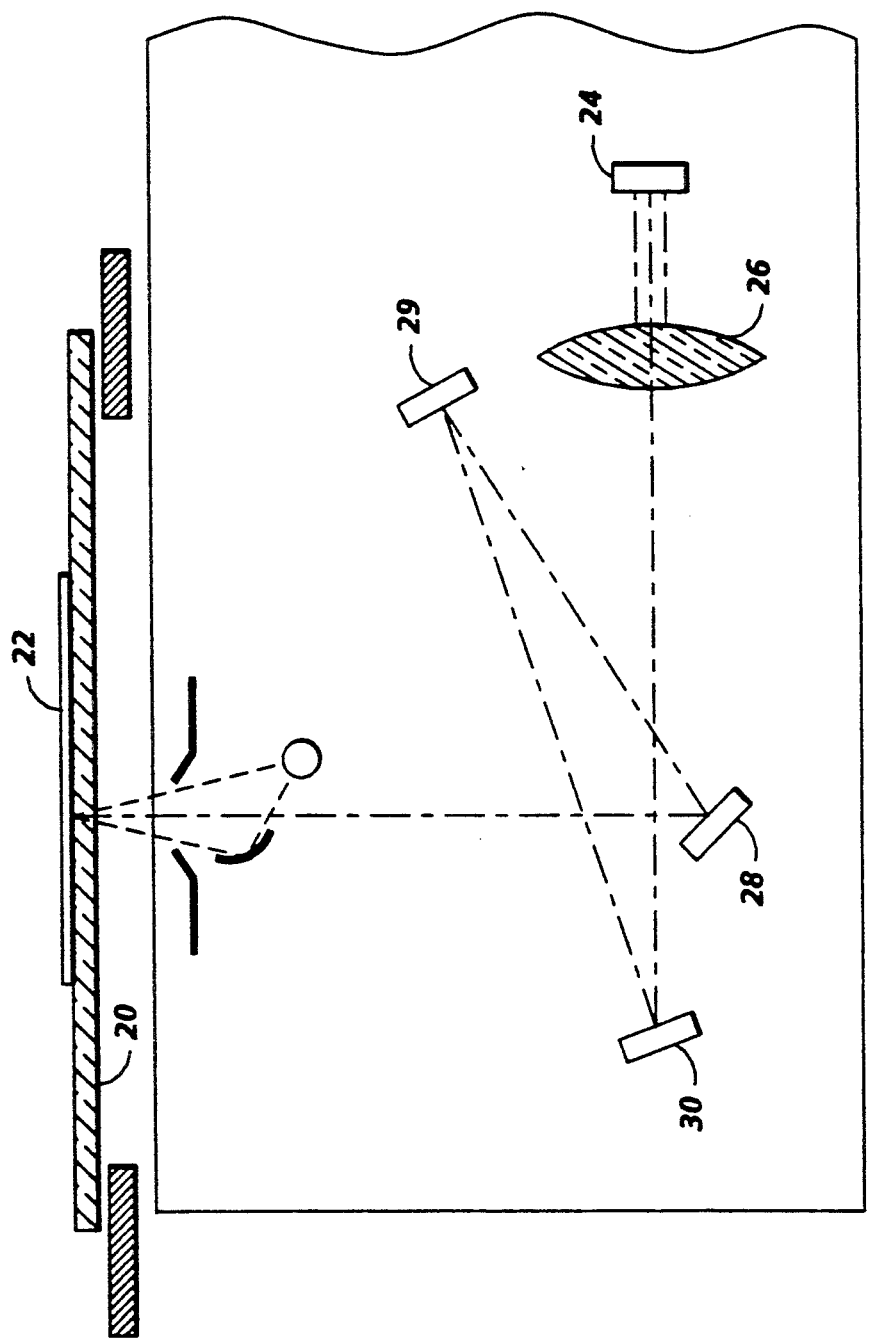
FIG. 4 is a schematic view showing certain construction details of the document scanner for the printing system shown in FIG. 1.

Referring particularly to FIGS. 2-4, scanner section 6 incorporates a transparent platen 20 on which the document 22 to be scanned is located. One or more linear arrays 24 are supported for reciprocating scanning movement below platen 20. Lens 26 and mirrors 28, 29, 30 cooperate to focus array 24 on a line-like segment of platen 20 and the document being scanned thereon. Array 24 provides image signals or pixels representative of the image scanned which, after suitable processing by processor 25, are output to controller section 7.

Processor 25 converts the analog image signals output by array 24 to digital and processes the image signals as required to enable system 2 to store and handle the image data in the form required to carry out the job programmed. Processor 25 also provides enhancements and changes to the image signals such as filtering, thresholding, screening, cropping, reduction/enlarging, etc. Following any changes and adjustments in the job program, the document must be rescanned.

Documents 22 to be scanned may be located on platen 20 for scanning by automatic document handler (ADF) 35 operable in either a Recirculating Document Handling (RDH) mode or a Semi-Automatic Document Handling (SADH) mode. A manual mode including a Book mode and a Computer Forms Feeder (CFF) mode are also provided, the latter to accommodate documents in the form of computer fanfold. For RDH mode operation, document handler 35 has a document tray 37 in which documents 22 are arranged in stacks or batches. The documents 22 in tray 37 are advanced by vacuum feed belt 40, document feed rolls 41 and document feed belt 42 onto platen 20 where the document is scanned by array 24. Following scanning, the document is removed from platen 20 by belt 42 and returned to tray 37 by document feed rolls 44.

For operation in the SADH mode, a document entry slot 46 provides access to the document feed belt 42 between tray 37 and platen 20 through which individual documents may be inserted manually for transport to platen 20. Feed rolls 49 behind slot 46 form a nip for engaging and feeding the document to feed belt 42 and onto platen 20. Following scanning, the document is removed from platen 20 and discharged into catch tray 48.

For operation in the CFF mode, computer forms material is fed through slot 46 and advanced by feed rolls 49 to document feed belt 42 which in turn advances a page of the fanfold material into position on platen 20.

Referring to FIGS. 2 and 3, printer section 8 comprises a laser type printer and, for purposes of explanation, is separated into a Raster Output Scanner (ROS) section 87, Print Module Section 95, Paper Supply section 107, and Finisher 120. ROS 87 has a laser 90, the beam of which is split into two imaging beams 94. Each beam 94 is modulated in accordance with the content of an image signal input by acousto-optic modulator 92 to provide dual imaging beams 94. Beams 94 are scanned across a moving photoreceptor 98 of Print Module 95 by the mirrored facets of a rotating polygon 100 to expose two image lines on photoreceptor 98 with each scan and create the latent electrostatic images represented by the image signal input to modulator 92. Photoreceptor 98 is uniformly charged by corotrons 102 at a charging station preparatory to exposure by imaging beams 94. The latent electrostatic images are developed by developer 104 and transferred at transfer station 106 to a print media 108 delivered by Paper Supply section 107. Media 108 as will appear may comprise any of a variety of sheet sizes, types, and colors. For transfer, the print media is brought forward in timed registration with the developed image on photoreceptor 98 from either a main Paper tray 110 or from auxiliary Paper trays 112, or 114. The developed image transferred to the print media 108 is permanently fixed or fused by fuser 116 and the resulting prints discharged to either output tray 118, or to finisher 120. Finisher 120 includes a stitcher 122 for stitching or stapling the prints together to form books and a thermal binder 124 for adhesively binding the prints into books.

Referring to FIGS. 1, 2 and 5, controller section 7 is, for explanation purposes, divided into an image input controller 50, User Interface (UI) 52, system controller 54, main memory 56, image manipulation section 58, and image output controller 60.

Figure 5A:
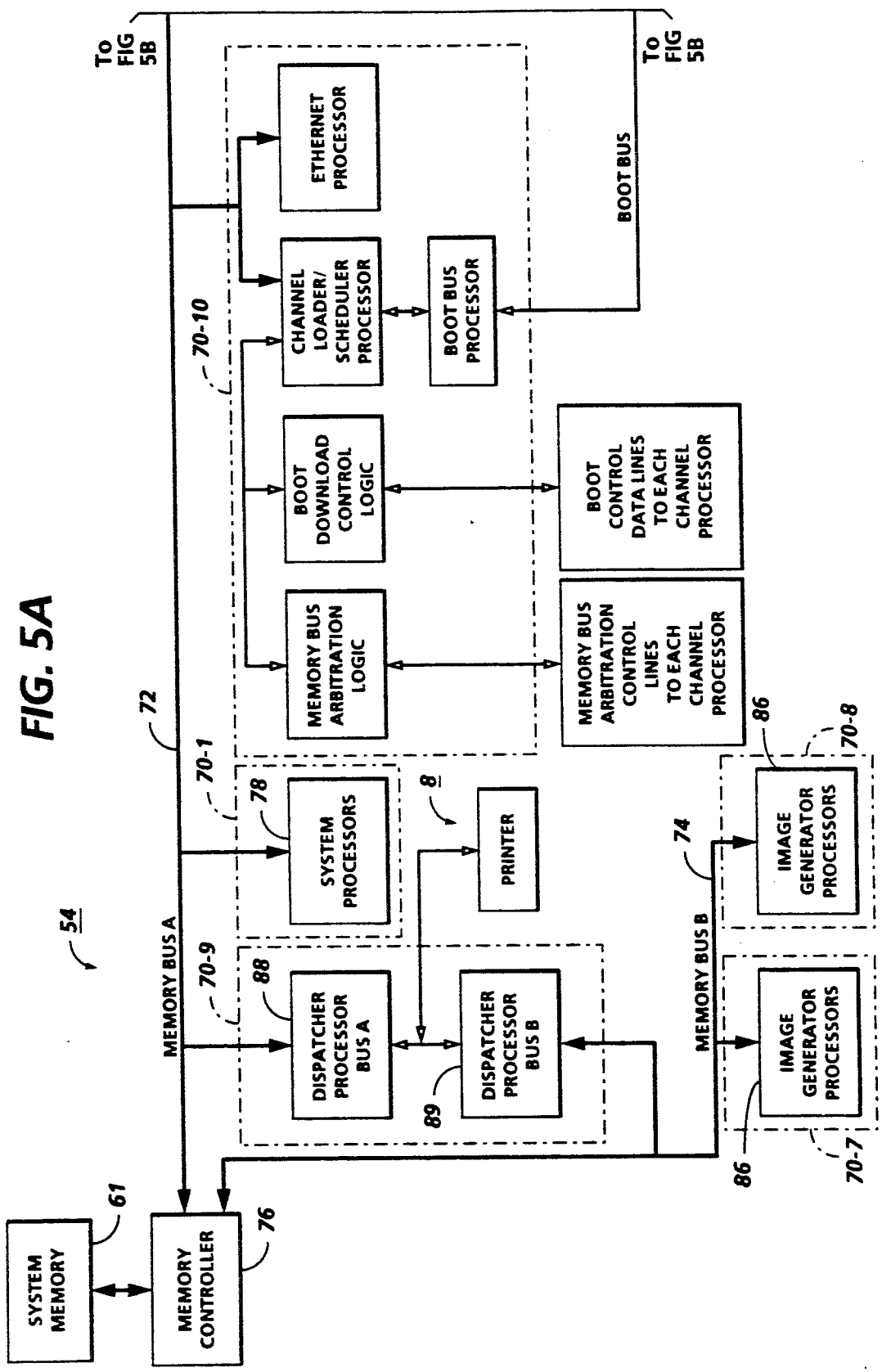
FIGS. 5A, 5B, and 5C comprise a schematic block diagram showing the major parts of the control section for the printing system shown in FIG. 1.
Figure 5B:
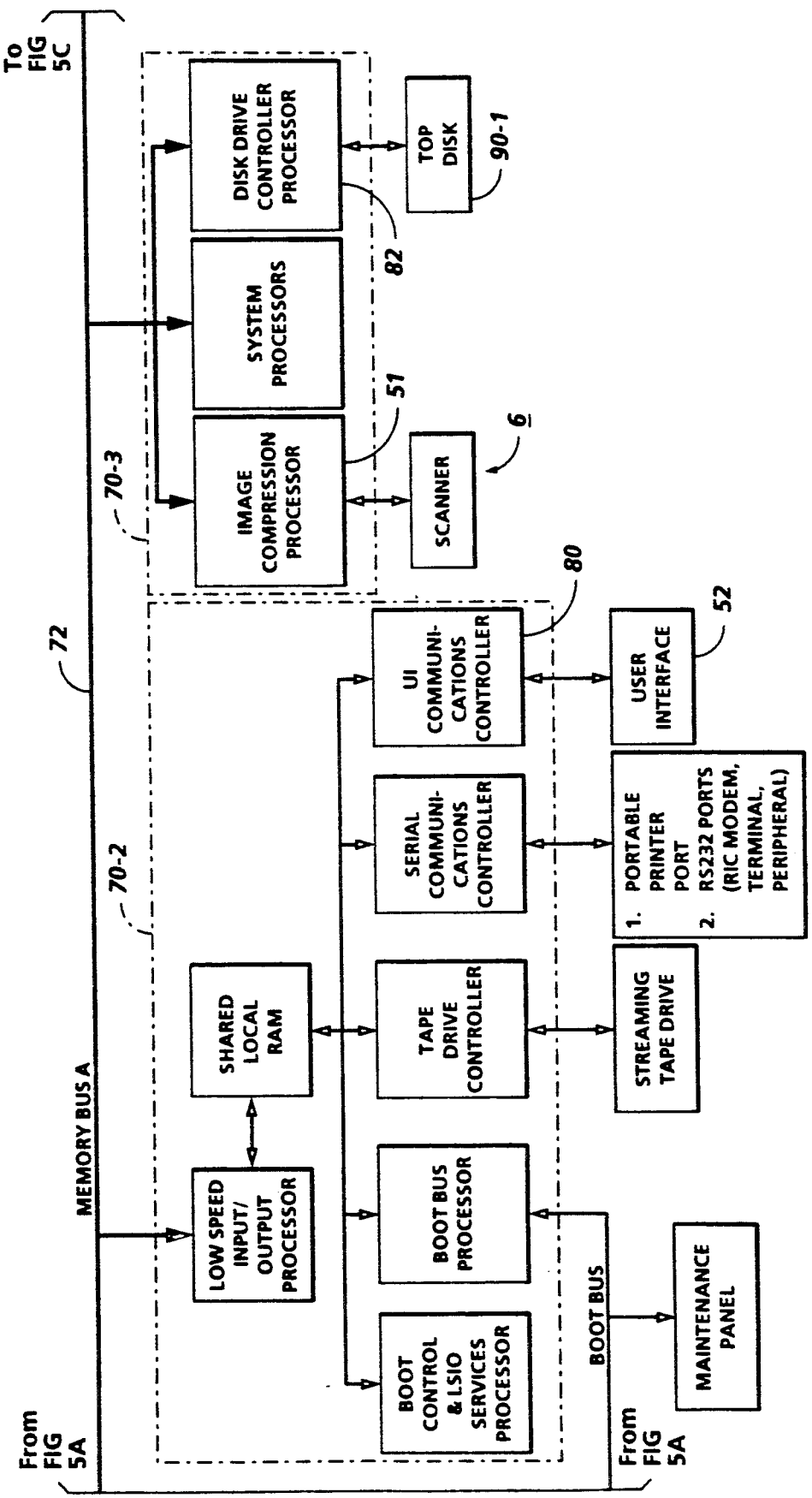
Figure 5C:
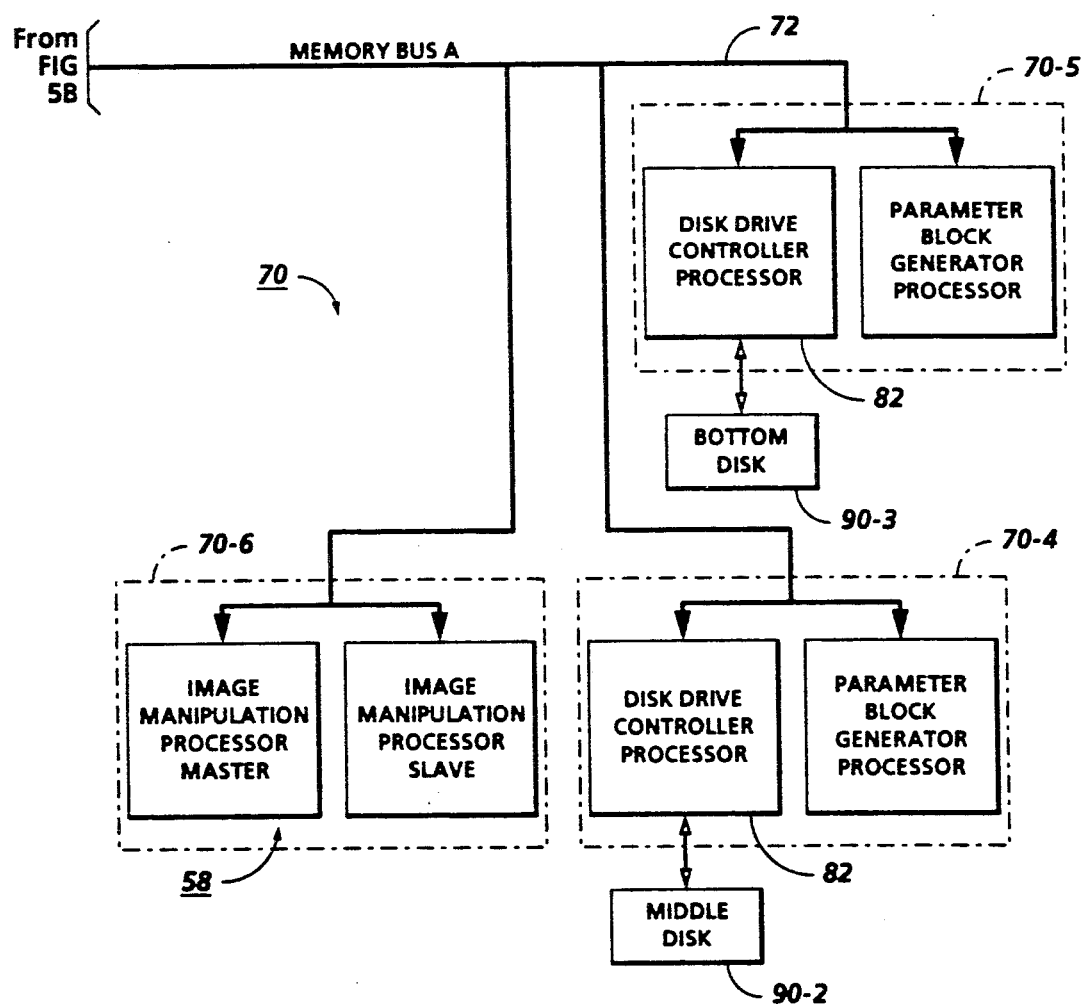

Referring particularly to FIGS. 5A-5C, control section 7 includes a plurality of Printed Wiring Boards (PWB's) 70, PWB's 70 being coupled with one another and with System Memory 61 by a pair of memory buses 72,74. Memory controller 76 couples System Memory 61 with buses 72, 74. PWB's 70 include system processor PWB 70-1 having plural system processors 78; low speed I/O processor PWB 70-2 having UI communication controller 80 for transmitting data to and from UI 52; PWB's 70-3, 70-4 and 70-5 having disk drive controller/processors 82 for transmitting data to and from disks 90-1, 90-2 and 90-3, respectively, of main memory 56 (image compressor/processor 51 for compressing the image data on PWB 70-3); image manipulation PWB 70-6 with image manipulation processors of image manipulation section 58; image generation processor PWB's 70-7 and 70-8 with image generation processor 86 for processing the image data for printing by printer section 8; dispatch processor PWB 70-9 having dispatch processors 88 and 89 for controlling transmission of data to and from printer section 8; and boot control-arbitration-scheduler PWB 70-10.

The scanned image data input from processor 25 of scanner section 6 to controller section 7 is compressed by image compressor/processor 51 of image input controller 50 on PWB 70-3. As the image data passes through compressor/processor 51, it is segmented into slices N scanlines wide, each slice having a slice pointer. The compressed image data together with slice printers and any related image descriptors providing image specific information (such as height and width of the document in pixels, the compression method used, pointers to the compressed image data, and pointers to the image slice pointers) are placed in an image file. The image files, which represent different print jobs, are temporarily stored in system memory 61 which comprises a Random Access Memory or RAM pending transfer to main memory 56 where the data is held pending use.

As best seen in FIG. 1, UI 52 includes a combined operator controller/CRT display consisting of an interactive touchscreen 62, keyboard 64, and mouse 66. UI 52 interfaces the operator with printing system 2, enabling the operator to program print jobs and other instructions, to obtain system operating information, instructions, programming information, diagnostic information, etc. Items displayed on touchscreen 62 such as files and icons are actuated by either touching the displayed item on screen 62 with a finger or by using mouse 66 to point cursor 67 to the item selected and keying the mouse.

Main memory 56 has plural hard disks 90-1, 90-2, 90-3 for storing machine Operating System software, machine operating data, and the scanned image data currently being processed.

When the compressed image data in main memory 56 requires further processing, or is required for display on touchscreen 62 of UI 52, or is required by printer section 8, the data is accessed in main memory 56. Where further processing other than that provided by processor 25 is required, the data is transferred to image manipulation section 58 on PWB 70-6 where the additional processing steps such as collation, make ready, decomposition, etc., are carried out. Following processing, the data may be returned to main memory 56, sent to UI 52 for display on touchscreen 62, or sent to image output controller 60.

Image data output to image output controller 60 is decompressed and readied for printing by image generating processors 86 of PWB's 70-7, 70-8 (seen in FIG. 5A). Following this, the data is output by dispatch processors 88, 89 on PWB 70-9 to printer section 8. Image data sent to printer section 8 for printing is normally purged from memory 56 to make room for new image data.

Figure 6:
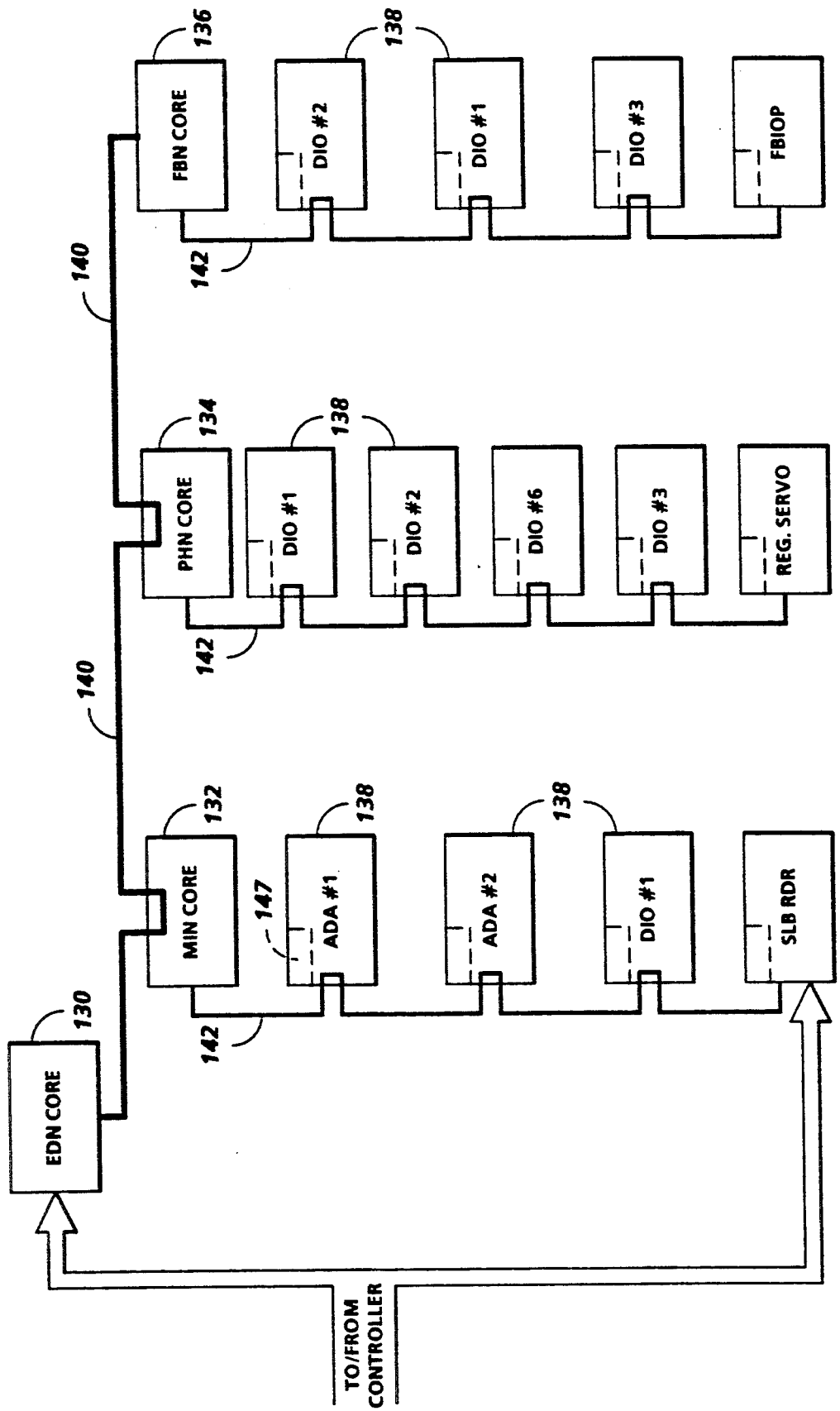
FIG. 6 is a block diagram of an Operating System, together with Printed Wiring Boards and shared line connections for the printing system shown in FIG. 1.

Referring particularly to FIG. 6, system control signals are distributed via a plurality of printed wiring boards (PWB's). These include EDN core PWB 130, Marking Imaging core PWB 132, Paper Handling core PWB 134, and Finisher Binder core PWB 136 together with various Input/Output (I/O) PWB's 138. A system bus 140 couples the core PWB's 130, 132, 134 and 136 with each other and with controller section 7 while local buses 142 serve to couple the I/O PWB's 138 with each other and with their associated core PWB.

On machine power up, the Operating System software is loaded from memory 56 to EDN core PWB 130 and from there to the remaining core PWB's 132, 134 and 136 via bus 140, each core PWB 130, 132, 134, 136 having a boot ROM (not shown) for controlling downloading of Operating System software to the PWB, fault detection, etc. Boot ROMs also enable transmission of Operating System software and control data to and from PWB's 130, 132, 134 and 136 via bus 140 and control data to and from I/O PWB's 138 via local buses 142. Additional ROM, RAM, and NVM memory types are resident at various locations within system 2.

Figure 7:
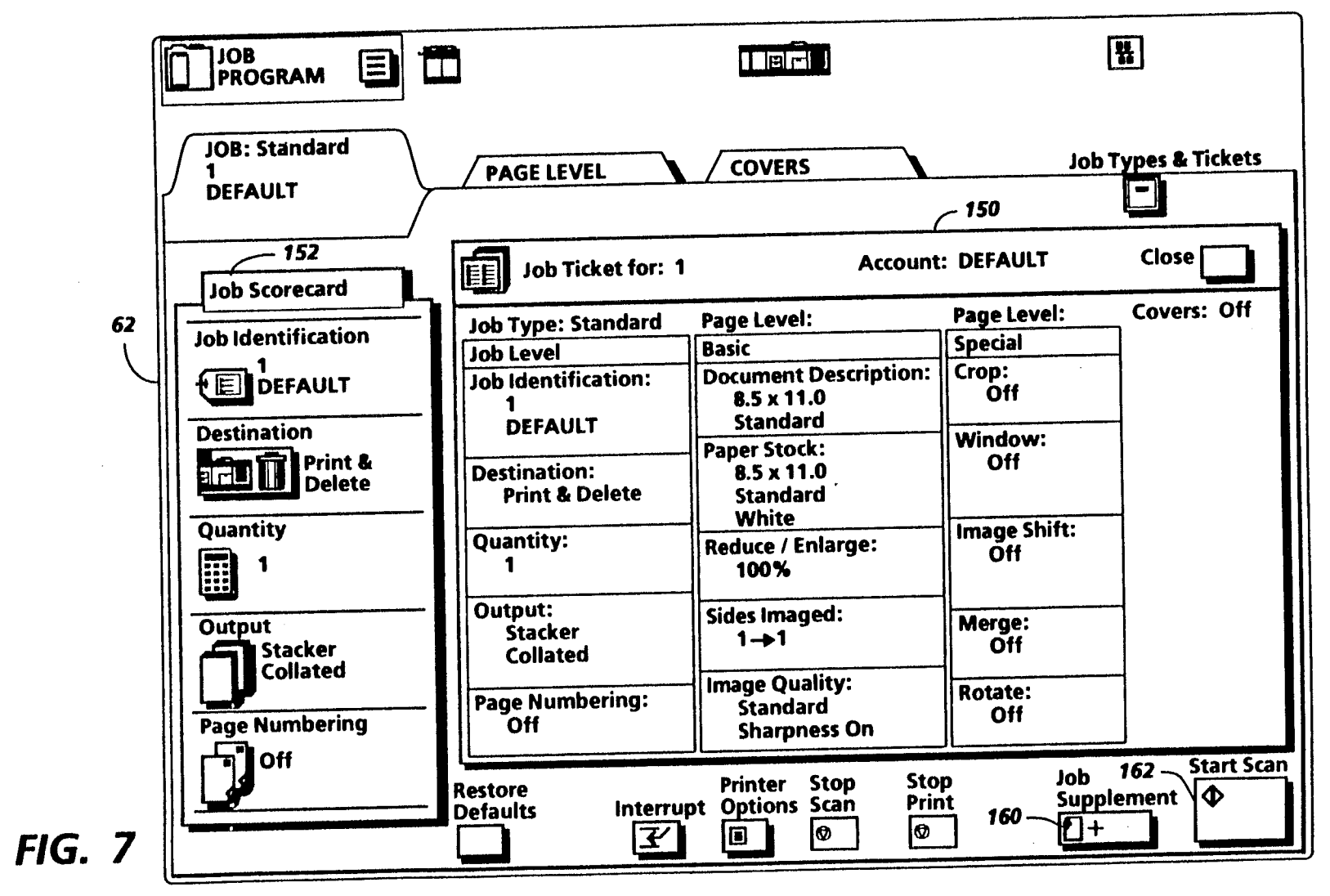

Referring to FIG. 7, jobs are programmed in a Job Program mode in which there is displayed on touchscreen 62 a Job Ticket 150 and a Job Scorecard 152 for the job being programmed. Job Ticket 150 displays various job selections programmed while Job Scorecard 152 displays the basic instructions to the system for printing the job.

Real Time Motion/Image Correction System

Figure 8:
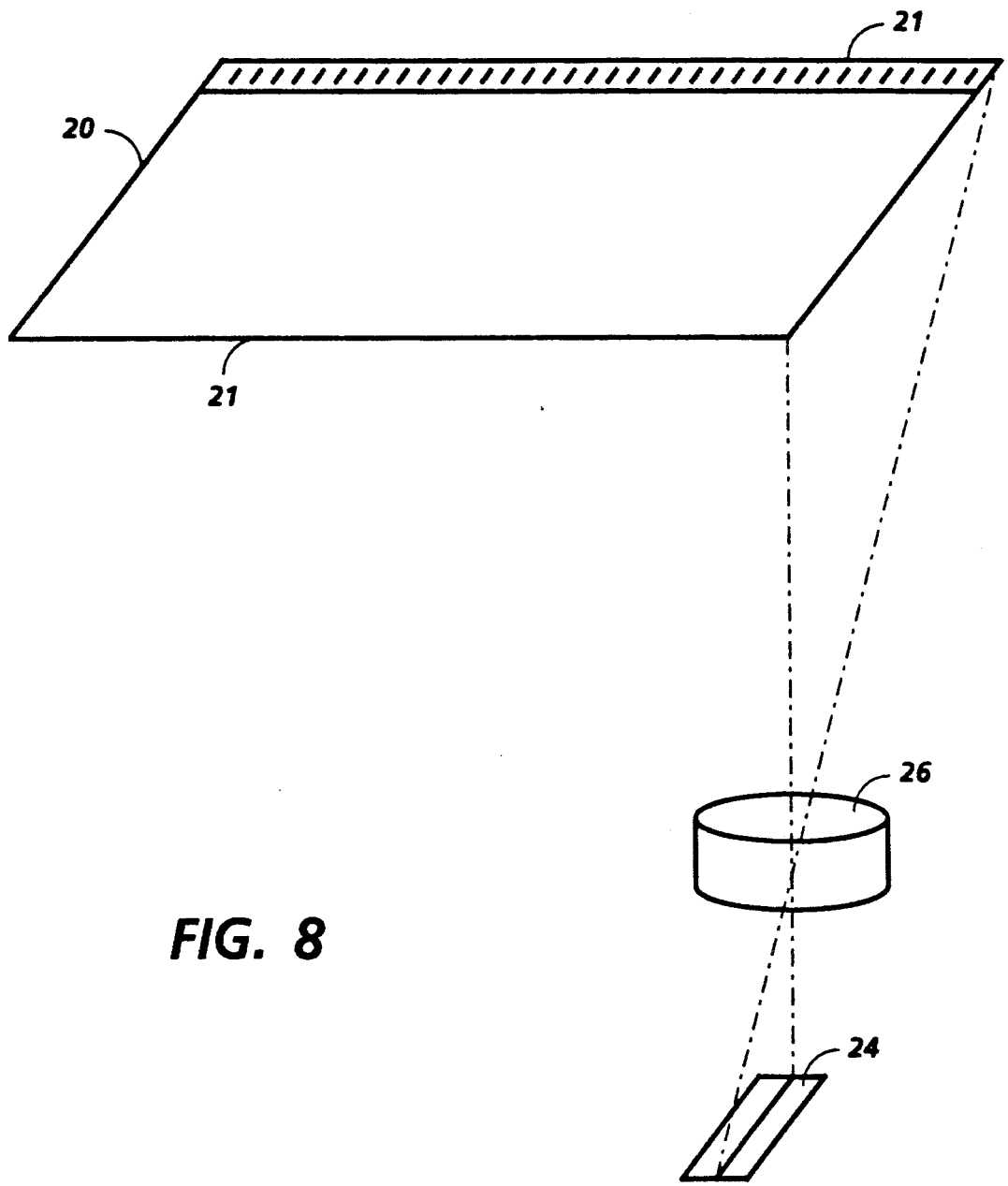
FIG. 8 is a schematic view showing a platen of the invention having optically scanning lines provided at one edge.

FIG. 8 is a schematic illustration showing the platen 20 provided with ruling lines 21 at one edge thereof. The ruling lines 21 are arranged such that they are read by the CCD 24 as each scan line of the platen is read.

Figure 9:
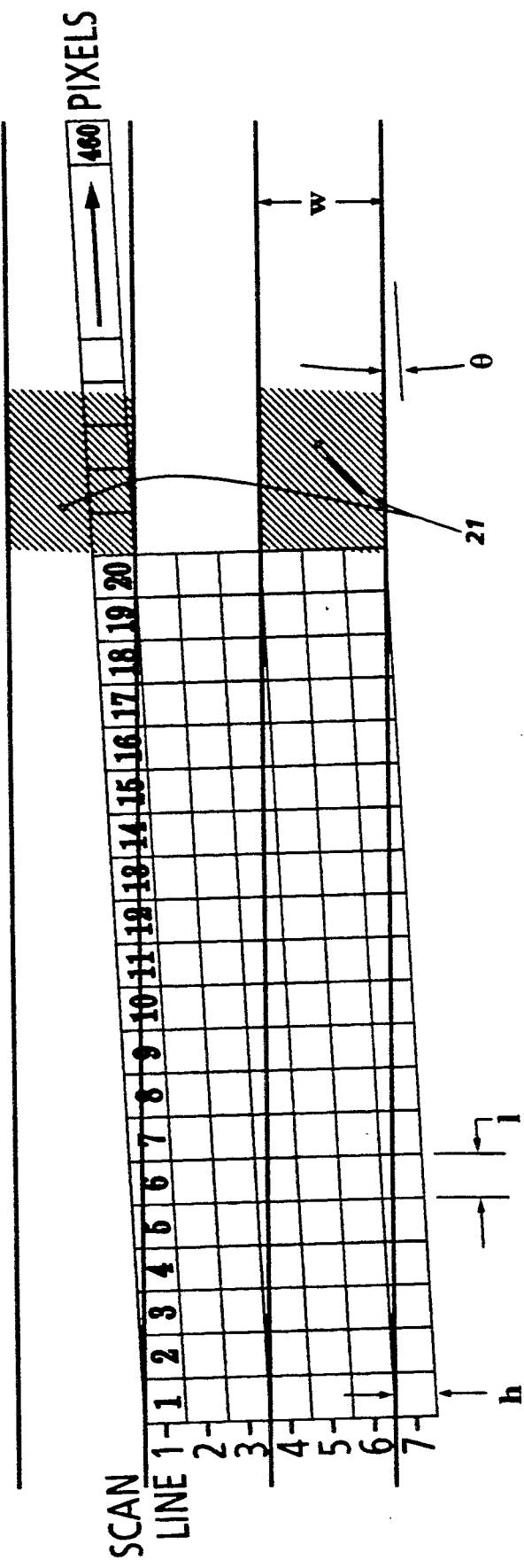
FIG. 9 is a view depicting ruling and pixel scan lines.

FIG. 9 shows an enlarged view of the pixel scan lines of the CCD 24 superimposed by the ruling lines 21. The ruling lines 21 are provided with a slight skew in relation to the pixel scan lines. The ruling lines may be provided with a skew allowing for about 20% coverage change per pixel count, and are preferably provided with a shallower angle of skew, for example from about 2% to about 5% coverage change per pixel count. This skew permits highly accurate scanning to be performed.

In particular, as the CCD scans a line on the platen 20, a portion of the ruling lines 21 is read at the beginning of each scan. The ruling lines are such that alternating black and white lines are read onto the individual pixels of the CCD for each scan line. The skew of the ruling lines permits the pixels to gradually change from black to white, and vise versa.

Referring more particularly to FIG. 9, pixel no. 1 will be read as white since a white portion of the ruling lines 21 completely covers that pixel. Scanning across scan line no. 1, a black portion of the ruling lines 21 begins to cover the pixels, until it completely covers pixel no. 20. Pixels nos. 1 and 20 are accordingly read as white and black respectively. Inbetween these pixels is a gray area where portions of both black and white of the ruling lines 21 cover each pixel. The pixel can be read as either black or white by setting a threshold value. The threshold value is a value at which a "gray" pixel is considered either black or white depending upon whether the gray pixel value lies above or below the threshold value. For example, a threshold value can be set such that pixels nos. 1 through 10 are read as white and pixels nos. 11 through 20 are read as black.

Since the ruling lines 21 are skewed in relation to the scan lines, a complete transition on scan line number 1 from white for pixel number 1 to black for pixel number 20 is provided. The transition is accomplished by comparing the output value of each pixel with a threshold value. The pixel will be read as black or white depending on whether the output value lies above or below the threshold value. This transition from white to black permits the generation of a square wave signal.

The generated square wave signal can be compared with a stored square wave signal corresponding to the speed which the scanning should follow. Comparisons with the signal being generated with the stored signal allow for any deviations to be detected and corrected.

A variable delay window at the end of each scan line may be provided which can be used to adjust any detected error in scanning speed. Thus, before resetting for the next or following scan line, the variable delay window can be used to adjust any detected error. Information from the scan line is processed and analyzed for motion error. The pixels of the CCD may then be reset for the following scan line. The analyzed information from the previous scan line is compared with information in a look up table to compute if the motion is accurate, and if not accurate, to compute the difference in the speed at which the scanner should follow. This difference in speed can be corrected by the variable delay time window of a succeeding scan line. The variable delay time window is provided with an amount of time which is passed at the end of each scan line before the next line is scanned. Thus, if the analyzed motion is slow, the delay window is lengthened so that the next scan line is read later than it would have been read had the motion been accurate. Likewise, if the analyzed motion of a preceding scan line was fast, the delay window is shortened to accelerate the start of the reading of the next scan line.

Gross errors, however, may use up the amount of time provided in the variable delay window. For example, the variable delay time window may shorten each time a line is analyzed and corrected. If this continues, the variable delay time window would be exhausted. One way to counter this problem is to extend the length of the window. However, if the length of the window is made too long, the scan rate would be slowed or the system would require more light to generate the output signals. To overcome this potential problem, a drive feedback may be used. The drive feedback is used to feed back information to a general drive control. For example, a current control of a feedback loop may be used to correct the scanning speed.

High frequency correction up to about 400 Hz associated with 2400 scan lines/second may be corrected by the variable delay window. Low frequency correction (about 0–40 Hz) may also be achieved with the drive feedback. The addition of a drive feedback may also reduce the need for the variable delay window.

To better illustrate the invention, reference will be made to a particular embodiment hereinafter. In the embodiment shown in FIG. 9, a skew angle $\theta$ of 1.91° is provided. This skew angle provides 5% steps in coverage from pixel to pixel over each scan line. Further, in this particular embodiment, a height h of an individual pixel is 0.00167 inch and a length l of each pixel is 0.0025 inch. The width w of each ruling line 21 is 0.005 inch. Thus, each ruling line of this embodiment has a width w which is equal to the height h of three pixels or scan lines.

The greater the angle of the skew of the ruling lines, the fewer pixels it takes to go from 0 to 100% coverage along the CCD for one scan. For example, a 120 lines/inch ruling line (ladder chart) has a 0.004167 inch wide line every 0.004167 inch. The CCD views a 0.005 inch wide scan at the platen every 0.0020833 inch. A threshold level of gray between 0 and 100% coverage is monitored during each scan. As this chosen threshold shifts up or down on the row of pixels for each scan, the positional displacement error of a scan relative to where the scan should be at the platen is known by counting the number of pixels shifted and multiplying that number by the percent error represented by a shift of one pixel. The greater the number of pixels it takes to go from 0 to 100% coverage by a skew line, the smaller the percentage error for one pixel shift.

The above described system may change any of a number of variables to optimize the system. For example, Table 1 shows variations of values for a 5% pixel shift (1.91° skewed ruling lines).

TABLE 1

Reference Chart of Variations
5% Pixel Shift
(1.91° Skewed Ruling)

| Scan Lines per Cycle | Pixels/Square Wave | Square Waves per Scan Line | Total No. of Pixels Used | Cycle Freq.[1] | Ref. Signal Freq.[1] | Ruling Line & Space Width | Ruling Pattern Width |
|---|---|---|---|---|---|---|---|
| 4 | 80 | 5.75 | 460 | 600 | 13,800 | .0033" | 1.150" |
| 5 | 100 | 4.80 | 480 | 480 | 11,520 | .0042 | 1.200 |
| 6 | 120 | 3.833 | 460 | 400 | 9,200 | .0050 | 1.150 |
| 7 | 140 | 2.857 | 400 | 342.8 | 6,857.2 | .0058 | 1.000 |
| 8 | 160 | 2.875 | 460 | 300 | 6,900 | .0067 | 1.150 |

[1]Frequency @ 4 inch/sec (ips) - Divide by (2) for 2 ips.

Ruling lines having a steeper angle, for example 45°, may also be sued to generate square waves. In such an embodiment, the gray levels of the black/white transition points are preferably used in reference to calculate error. By looking at the gray levels, it can be determined whether a line has shifted more towards black or white. Analyzing the gray levels, however, may take longer to calculate correction signals, and may be more prone to signal noise because it would be necessary to calculate a gray level corresponding to a voltage of each pixel.

Table 2 provides a number of variations in the arrangement of the ruling lines and the positional accuracy which may be obtained.

TABLE 2

| No. | Ruling Lines (Lines/in.) | Line Width | Line Angle | No. of Pixels between 0 & 100% coverage | No. of Pixels used for monitoring 2 points | Ruling Line Width at Platen (in.) | Positional Accuracy | | |
|---|---|---|---|---|---|---|---|---|---|
| | | | | | | | % of full scan line width per (1) pixel on scale | % of scan line width used per (1) pixel on scale | Displacement of lens per (1) pixel of the scale (μ in) |
| 1 | 120 | .004167 | 87.138° | 20 | 60 | .300 | 5.0 | 12.02 | 19.69 |
| 2 | 120 | .004167 | 88.091° | 30 | 90 | .450 | 3.33 | 7.93 | 13.11 |
| 3 | 120 | .004167 | 88.568° | 40 | 120 | .600 | 2.5 | 6.01 | 9.84 |
| 4 | 120 | .004167 | 88.854° | 50 | 150 | .750 | 2.0 | 4.81 | 7.87 |
| 5 | 120 | .004167 | 89.045° | 60 | 180 | .800 | 1.67 | 4.01 | 6.57 |

Self-diagnostic System

Figure 11A:
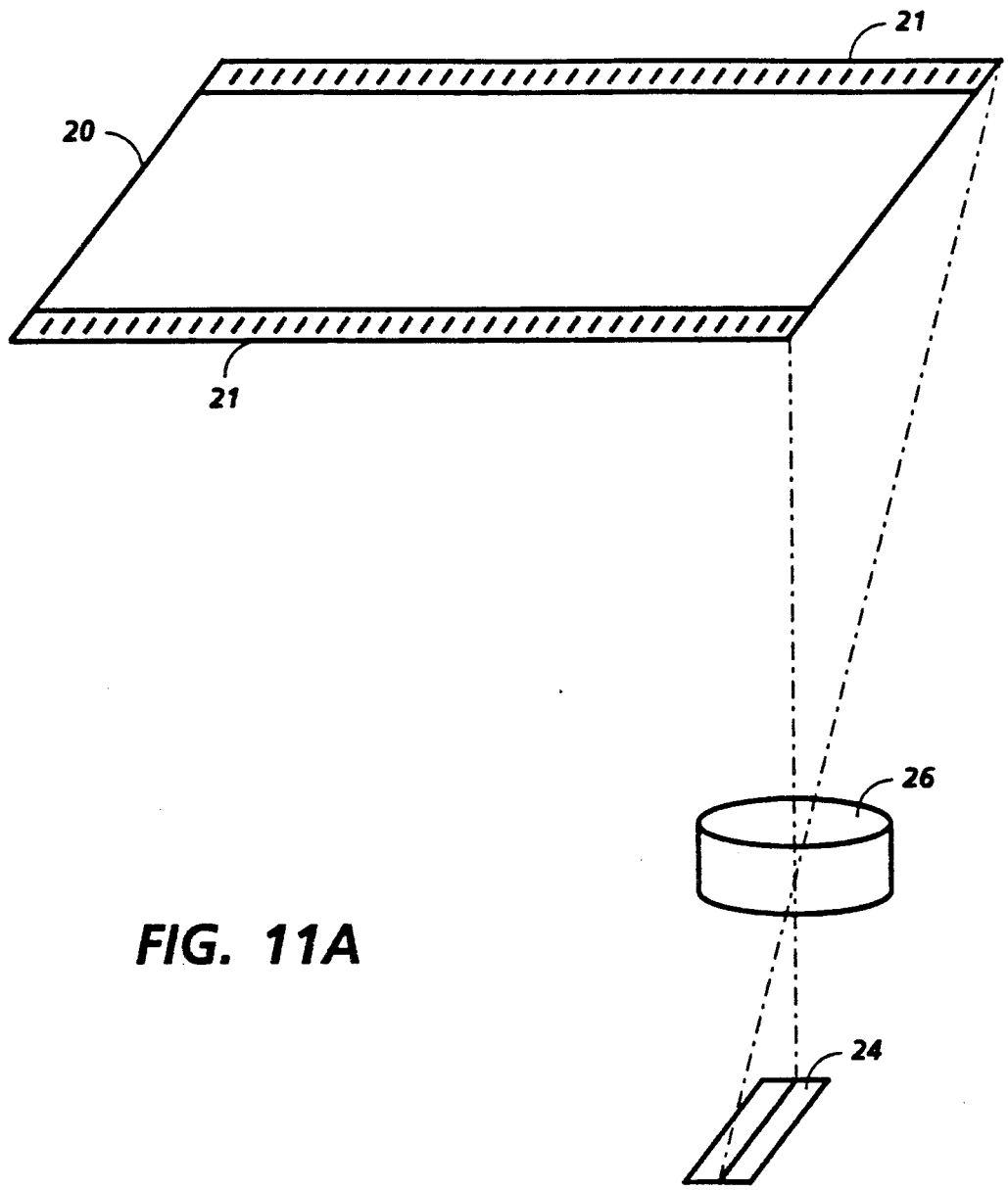
FIGS. 11(a) and 11(b) are schematic illustrations of a self-diagnostic system of the invention utilizing more than one set of optical scanning lines.
Figure 11B:
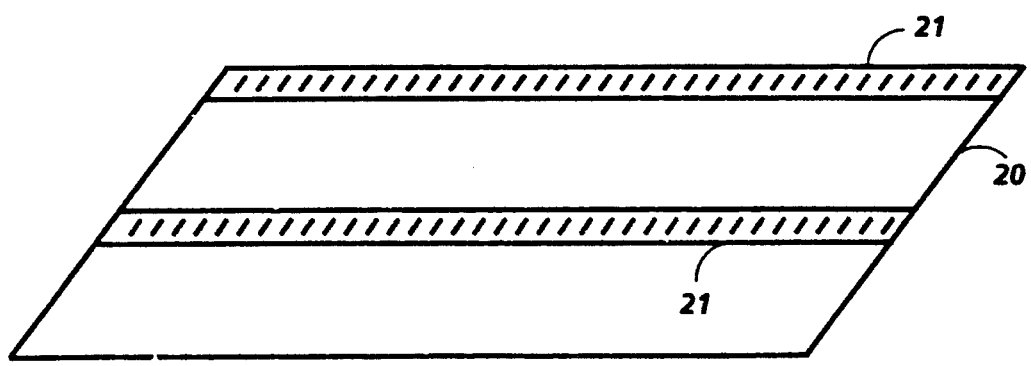

The concept of the present invention may also be used to provide a self-diagnostic system for a scanner. In such a scanner, one or more sets of ruling lines may be provided over the platen. As shown in FIG. 11(a), two sets of ruling lines, for example, may be provided at opposite edges of the platen and an be referenced to measure skew or averaged for general slow scan motion. A set of ruling lines may also be provided as a target in the center of the platen to check mirror/optics vibrations. FIG. 11(b) shows two sets of ruling lines wherein one set is provided at the center of the platen. Alternatively, the ruling lines can extend over the entire area over the platen, and areas can be selected to be analyzed.

As in the above-described embodiments, the signals from the ruling lines may be thresholded to form separate square wave signals. In the case of ruling lines not extending over the entire area of the platen, a majority of the length of each scan is blank since the only information received by the CCD would be from the ruling lines. For example, the ruling lines may only cover about 1/5 the length of the scanned line. To produce a continuous wave over the entire scan line, the output signal from the ruling lines can be stretched in time over the entire length of the scanned line. By stretching this information from the ruling lines, a continuous wave is produced. Continuous waves are preferred by wave form analyzers. Stretched signals form each scanned line may be stitched together to form a continuous signal over the length of the surface being analyzed. These signals may be easily analyzed for frequency, velocity, displacement, and other errors. Such a system is an ideal method to accurately measure vibration problems introduced by natural resonances, drives, fans, and the like. It should be noted, however, that reference signal frequencies are reduced by the number of times they are stretched to form continuous waves. For example, a signal from a ruling line which covers 1/5 of the full scan line would have a frequency which is 1/5 that of a full scan line.

Figure 10:
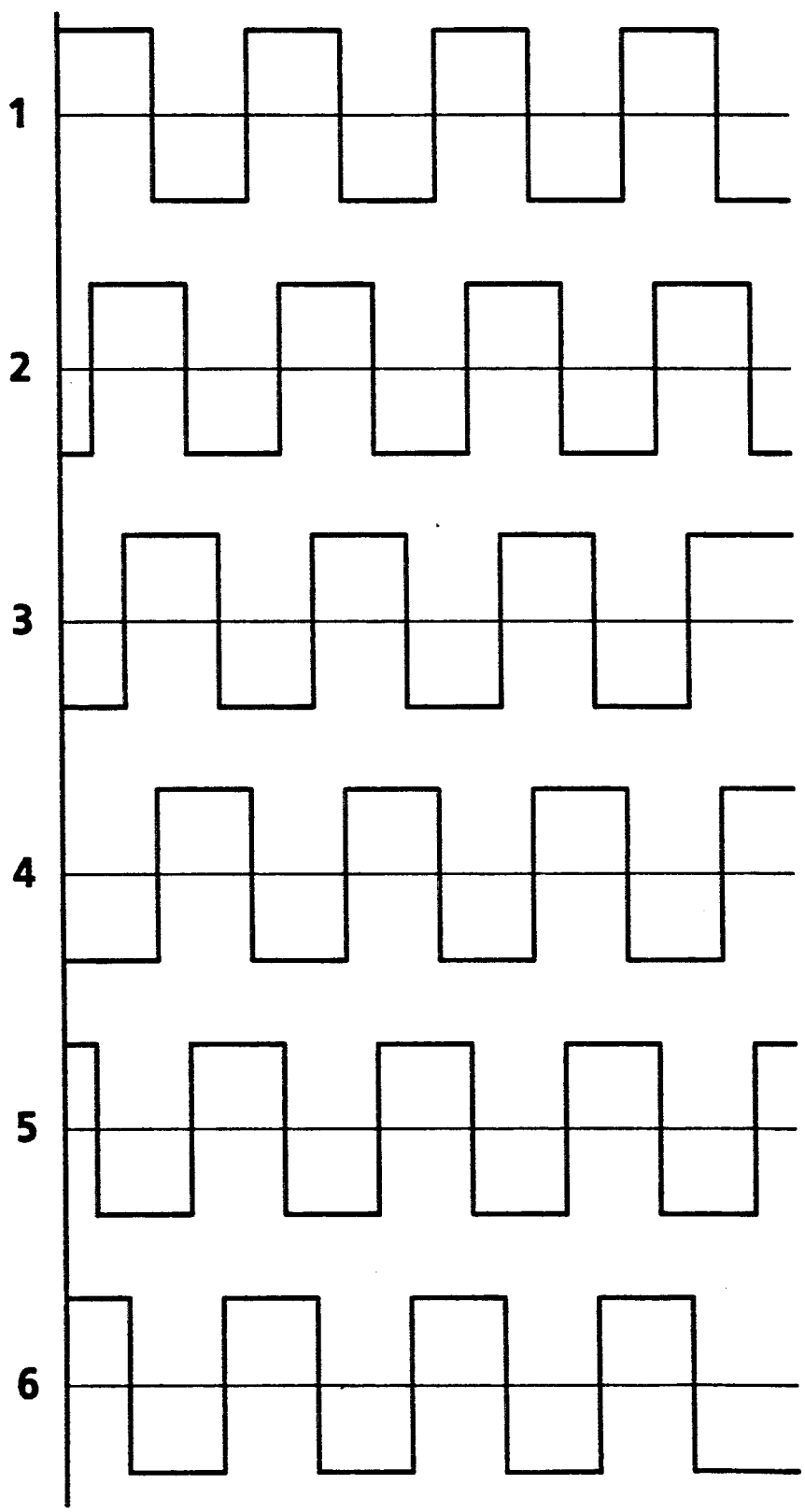
FIG. 10 is an illustration of a full cycle of a square wave reference signal for six scan lines.

FIG. 10 shows the square wave signals generated for scan line numbers 1-6 using the above skew angle of 1.91°. In this example, 460 pixels of the scan line are viewing the ruling lines. By stitching the signals together, 3.833 square waves per scan line are generated to form a continuous 6.9 kHz reference signal. The square wave for each scan line is shifted due to the angle of skew.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. A platen comprising a target in the form of a succession of ruing lines provided along one edge thereof, said ruling lines being inclined at an angle relative to a direction of scan of an optical sensor array, the incline providing no greater than about 20% coverage change of a pixel on a scanning line of the array.

2. The platen of claim 1, wherein said coverage is between about 2% and about 5%.

3. The platen of claim 1, wherein said array is a charge coupled device.

4. An image scanner, comprising:
   an optical sensor array for generating an output signal in response to light;
   a platen having an optical target in the form of a succession of ruling lines provided along one edge thereof, said ruling lines being inclined at an angle relative to a direction of scan of said optical sensor array; and
   means for comparing said output signal generated by the optical sensor array with a reference signal and correcting the scanning motion of the optical sensor based on any deviation from said reference signal.

5. The scanner of claim 4, wherein said array is a charge coupled device.

6. The scanner of claim 4, further comprising means for converting said output signal into a square wave signal.

7. The scanner of claim 4, wherein said comparing means compares said output signal with a threshold value and converts the output signal into one of two values depending on whether the value of the output signal is above or below said threshold value.

8. The scanner of claim 4, further comprising a variable delay window between scan lines.

9. The scanner of claim 4, further comprising a drive feedback.

10. The scanner of claim 4, wherein said incline provides no greater than about 20% coverage change of a pixel on a scanning line of the array.

11. The scanner of claim 4, wherein said incline provides about 2% to about 5% coverage change of a pixel on a scanning line of the array.

12. A method for analyzing motion of a scanner, comprising the steps of:
   providing an optical target in the form of a succession of ruling lines on one edge of a scanner, the ruling lines being inclined at an angle relative to a direction of scan of an optical sensor array;

scanning at least one scanning line of the platen and producing an output signal therefrom;

comparing the output signal with a threshold value and producing a square wave signal; and correcting the scanning motion of the array based on said square wave signal.

13. The method of claim 12, wherein said incline provides no greater than about 20% coverage change of a pixel on a scanning line of the array.

14. The method of claim 12, wherein said incline provides about 2% to about 5% coverage change of a pixel on a scanning line of the array.

15. The method of claim 12, wherein the generated square wave signal is compared with a reference signal.

16. The method of claim 12, wherein a variable delay window is used to correct the scanning motion.

17. The method of claim 12, wherein a drive feedback is provided for correcting the scanning motion.

18. A diagnostic apparatus, comprising:

a surface having at least one optical target in the form of a succession of ruling lines inclined at an angle relative to a direction of scan of an optical sensor array, the incline providing no greater than about 20% coverage change over a pixel on a scanning line of he array.

19. The apparatus of claim 18, wherein said incline provides about 2% to about 5% coverage change over a pixel on a scanning line of the array.

20. The apparatus of claim 18, wherein two optical targets are placed at opposite edges of said surface.

21. The apparatus of claim 20, further comprising a third optical target between said two optical targets.

22. The apparatus of claim 18, wherein one target is placed at an edge of said surface while another target is placed substantially at a center of said surface.

23. The apparatus of claim 18, further comprising means for generating output signals from said ruling lines.

24. The apparatus of claim 23, further comprising means for averaging said output signals from said at least one optical target.

25. The apparatus of claim 18, further comprising means for reading and comparing output values from said at least one optical target with a threshold value.

26. The apparatus of claim 18, wherein said ruling lines extend substantially entirely over said surface.

27. A diagnostic apparatus, comprising:

a surface having at least two optical targets in the form of a succession of ruling lines inclined at an angle relative to a direction of scan of an optical sensor array; and means for generating output signals from said ruling lines.

28. A method for diagnosing scanning motion, comprising the steps of:

providing at least two optical targets in the form of a succession of ruling lines on a surface to be diagnosed, the ruling lines being inclined at an angle relative to a direction of scan of an optical sensor array;

scanning at least one scanning line of the array and producing an output signal therefrom; and comparing the output signal with a threshold value and producing a square wave signal.

29. The method of claim 28, wherein an incline of said ruling lines provides no greater than 20% coverage change over a pixel on each scanning line of the array.

30. The method of claim 27, wherein an incline of said ruling lines provides about 2% to about 5% coverage change over a pixel on each scanning line.

31. The method of claim 28, wherein said at least two targets are provided at opposite edges of said surface.

32. The method of claim 31, wherein a third target is provided between said two targets.

33. The method of claim 28, wherein one target is provided at one edge of said surface, while the other target is provided substantially at the center of said surface.

34. The method of claim 28, further comprising the step of averaging values produced from said output signals for each of said at least two ruling lines.

* * * * *